March 20, 1951     R. M. STORER     2,545,714
FASTENING DEVICE

Filed March 7, 1944                         2 Sheets-Sheet 1

INVENTOR.
RICHARD M. STORER
BY
*H. A. McGrew*
ATTORNEY

March 20, 1951  R. M. STORER  2,545,714
FASTENING DEVICE

Filed March 7, 1944  2 Sheets-Sheet 2

INVENTOR.
RICHARD M. STORER
BY
*H. A. McGrew*
ATTORNEY

Patented Mar. 20, 1951

2,545,714

UNITED STATES PATENT OFFICE 2,545,714

FASTENING DEVICE

Richard M. Storer, Denver, Colo.

Application March 7, 1944, Serial No. 525,331

14 Claims. (Cl. 24—221)

This invention relates to devices for fastening two or more parts or plates together, and more particularly to quick-opening fastening devices, such as cowling fasteners for airplanes.

The fastening device of this invention is particularly adapted to secure together two parts, one of which is to be removed and replaced quickly, such as a cowling section attached to a support of the engine nacelle of an airplane. The cowling must be removed and replaced quickly in inspecting or replacing the engine, and a plurality of fastening devices normally are utilized in attaching each cowling section to its support. In addition to its use on airplanes, the fastening device of this invention may be utilized for fastening access plates on farm machinery, panels on motor trucks, refrigerator equipment, heating units, radios and other electronic equipment, and the like.

A cowling fastener previously used to a considerable extent consists of a stud rotatably secured to the outside plate, such as the cowling of an airplane, and a relatively heavy special wire attached to the inside plate, such as the cowling support. The stud may have a flat head and be fastened by a grommet in a countersunk or dimpled hole in the cowling, so that the head of the stud is flush with the cowling. The shank of the stud is provided with a bayonet slot having a shoulder at its upper end, the slot being adapted to slip over the central portion of the wire which extends across an aperture in the support, the stud being inserted through the aperture. Upon rotation of the stud, the wire is pulled up into the slot and is locked in position on the shoulder. Each end of the wire is provided with a spring coil, each coil being attached by a rivet to the support on opposite sides of the aperture.

Such a fastener is not as strong as could be desired, as the strength of the fastener before deflection occurs is limited by the load necessary to flex the wire, the initial load transmitted from the stud to the support being taken directly by the wire. Thus, the total strength of such a fastener is seldom utilized effectively, since the parts tend to separate upon the imposition of a relatively light load; and the size of the wire must be unduly great if greater strength is to be provided to resist initial separation of the parts. Also, due to separation on light load, a cowling or other part tends to vibrate either directly or sympathetically with other vibrations, such as those set up by an engine or other causes. The numerous stress reversals in the stud and other parts produced by such vibrations tend to produce fatigue failure, and, particularly at relatively high plane speeds, for instance, the cowling may become loose, fly off, or otherwise be damaged.

Among the objects of this invention are to provide a device for fastening two parts together which is strong and resists deflection between the parts, even upon the imposition of a relatively heavy load; to provide such a device in which the load is transmitted directly from one part to the other, instead of being taken initially by a spring or other resilient means subject to deflection; to provide such a device which may be constructed to produce a minimum of air resistance; to provide such a device which may be readily locked and unlocked, and which is operable by a simple instrument; to provide such a device in which vibration will have little effect upon the tightness of the connection; to provide such a device which is relatively simple in construction, but which may be varied in design or shape; to provide such a device which may be constructed to be used interchangeably with the previous type of device generally in use; and to provide such a device which is relatively easy and cheap to manufacture.

Other objects and novel features will become apparent from the description which follows.

In accordance with this invention, a device for fastening two parts together may comprise a stud rotatably attached to one part and a receiver attached to the other part, the shank of the stud being provided with outwardly extending cam surfaces and the receiver being provided with a pair of resiliently mounted arms adapted to extend in substantially parallel relation across a hole in the second part through which the stud may be inserted. Preferably, each stud-receiving portion of an arm is provided with a notch into which an edge or cam surface of the stud shank will fall when the stud is turned to locking position, and the receiver is preferably mounted so that the arms will be flush with the surface of the second part, or with a beveled or dimpled edge or flange around the hole through which the stud is inserted. The arms are spread apart laterally by a turning movement of the stud, instead of being drawn toward the part as in the previous type of fastener, and the initial load is thus transmitted directly to the second part from the stud, instead of through the coils of a spring element. Also, the initial load causes no deflection because the friction between the arms and the second part or flange thereon resists outward movement of the arms, and this friction increases as the load increases. Thus, for normal loads, there is little tendency for the parts or plates to separate, even slightly.

The stud-receiving portions of the arms may be made heavier in section than other portions of the arms to provide greatest strength over the hole and greatest resiliency at points spaced therefrom. The stud may be provided with only one cam surface, although for more equal stress distribution, two opposed cam surfaces are preferably provided. The receiver may be constructed so that it can be attached to the second part, such as the cowling support, by rivets placed in the same relative position as the rivets fastening the coils at the end of the heavy spring wire of the device previously in use. The receiver may be formed of spring wire attached to the support by rivets or the like or by a separate base. In addition, the receiver may be stamped or punched out of flat stock, and the operations carried out automatically in a dieing machine, transfer press, or the like. The flat stock used may be annealed spring stock, heat treated after the stamping operation to produce the desired spring-like properties. An advantage of punching or stamping lies in the cheapness and ease with which the parts can be produced in huge quantities.

Other novel features, such as those which prevent undue separation upon the imposition of abnormal loads and the various ways in which the device can be made, will be apparent from the following more detailed description of specific embodiments of this invention, taken with reference to the accompanying drawings, in which:

Fig. 12 is an isometric drawing of the receiver of the device of Fig. 9, which receiver is preferably stamped or punched out of sheet metal or the like;

Fig. 13 is a plan view of a strip of metal from which receivers as in the device of Fig. 9 may be stamped or punched in a dieing machine or the like;

Figure 1:
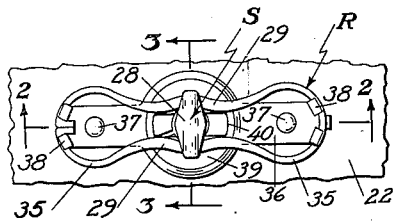
Fig. 1 is a plan view of a fastening device constructed in accordance with this invention in locked position and holding two parts together.

A fastening device constructed in accordance with this invention, as illustrated in Figs. 1 to 4, inclusive, includes a stud S rotatably attached to a part or outer plate 21, which corresponds to an airplane cowling or the like, and a receiver R, which is attached to a second part or inner plate 22, which corresponds to the cowling support. The stud may be fastened within a hole 23 in plate 21, the edge of the hole being beveled or dimpled to form an inwardly extending flange 24 which accommodates head 25 of the stud and permits the head of the stud to lie flush with the outer surface of the plate or cowling, as in Figs. 2 and 3. The stud is rotatably attached to the outer plate by a grommet 26, which prevents the stud from falling out of the plate when the stud and receiver are detached, and which may be provided with a groove into which the edge of flange 24 is swedged or otherwise forced.

A shank 27 of the stud may be cylindrical in shape, and provided at its end with a wedge-shaped portion 28 to facilitate insertion between arms 29 of receiver R. The stud shank is tapered laterally outwardly and upwardly away from the head, to form outwardly extending cam surfaces 30 adapted to engage grooves or detents 31 in arms 29 when the stud is turned through approximately 90°, as by insertion of a simple tool, such as a screw driver or coin, into a slot 32 in the head of the stud.

A hole 33 in plate 22 permits entry of the stud, and to accommodate the flange 24 of plate 21, the edge of hole 33 may be beveled or dimpled to provide an inwardly extending flange 34 forming an aperture into which the grommet also extends.

Figure 3:
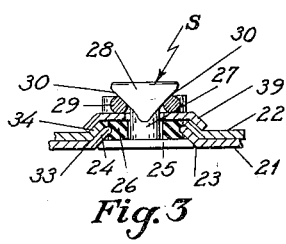
Fig. 3 is a cross section of the device and parts taken along line 3—3 of Fig. 1.

In accordance with this invention, the arms 29 are not moved inwardly and outwardly from the plates to be held together as in the previous device, but are instead moved laterally when the stud is turned from locking to unlocking position and vice versa. Arms 29 comprise a portion of a spring element which may be formed from one or more pieces of spring wire into the shape of an open center or modified figure-eight to provide a loop 35 connecting or formed as a continuation of each end of an arm 29 and thereby impart sufficient lateral resiliency to the arms 29 to make locking and unlocking relatively easy. Also, the arms will at all times bear solidly against either plate 22 or a base 36 by which the spring element of the receiver of Fig. 1 is attached to plate 22. Base 36 if employed may be formed of sheet metal or the like, attached to plate 22 by rivets 37 in a position corresponding to that of the attaching rivets of the previous fastener in widespread use. At each end of base 36, ears 38 are bent up and over or around loops 35 to hold the spring element in place. Base 36 may be stamped or otherwise formed to provide a boss 39 which coincides with and fits over flange 34, and which, as in Fig. 3, provides thrust surfaces for arms 29, to transmit the thrust of the stud directly to plate 22. Boss 39 may be provided with a key-shaped slot 40 for guiding the stud between arms 29 and aligning the stud with the arms, thereby minimizing the possibility of an end of the stud shank being caught on the edge of the hole when the stud is turned to unlocking position.

As will be evident, the initial load on the stud does not cause any deflection of the resilient arms 29, but instead is transmitted directly to boss 39 and thence to plate 22. This causes the plates to be held together securely, and also minimizes any tendency for separation of the plates to occur during vibration. Due to friction between arms 29 and boss 39—which friction increases as the load on the stud increases—the device will withstand a relatively large load before the stud will cause the arms to separate slightly and thereby permit the stud to move downwardly when in the relative position of Figs. 2 and 3. Of course, it is impossible for the stud to be pulled out of the receiver when the stud is in the locked position since the cam surfaces 30 will engage the sides of boss 39 when a load of sufficient magnitude is imposed upon the stud to force the arms apart.

Figure 6:
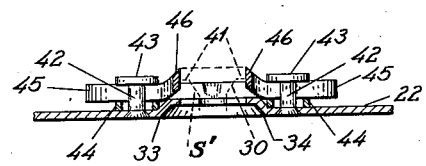
Fig. 6 is a longitudinal section of the receiver and parts taken along line 6—6 of Fig. 5.

The lower side of the stud-engaging portion of the arms may be flattened to increase the friction against boss 39, and the outer portions of the wedge end of the stud may be provided with flat surfaces 41, as shown in dotted lines of stud S' in Fig. 6, so that upon a slight outward movement of the arms, the flat surfaces 41 will engage the tops of the arms, thereby transmitting the load along lines parallel to the central axis of the stud, and preventing any further spreading movement of the arms. It will be understood, however, that the load which will cause any appreciable spreading movement of the arms will exceed any normal loads imposed on the device.

Figure 5:
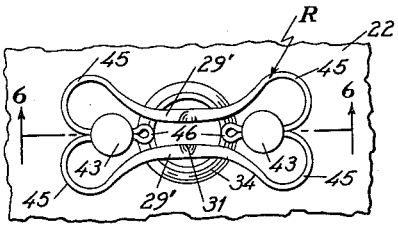
Fig. 5 is a plan view of a receiver, attached to one of the parts to be held together, of an alternative construction of the embodiment of Fig. 1.

In the alternative construction illustrated in Figs. 5 and 6, the receiver R comprises a spring member formed of square or round stock and having arms 29' which are provided with detents 31 and which extend across opposite sides of hole 33. In a manner similar to the previous construction, the arms rest directly on flange 34 and the spring member may be attached to plate 22 by special rivets 42 having enlarged heads 43, with spacing thimbles or rings 44 beneath the spring member to level the spring member across flange 34.

The spring member may be formed of one continuous piece of spring material, with a loop 45 formed on the end of each arm 29 and each loop doubling back on itself and the end of each loop extending inwardly, and then upwardly as in Fig. 6, to form a tab 46 which guides the stud in and out of the receiver. Tabs 44 also prevent the flat surfaces 41 of stud S' from catching on the edge of hole 33, when the stud is turned to unlocked position and the outer plate is to be removed. A stud having flat surfaces at the end of each cam surface is preferably utilized when the hole in the inner plate, corresponding to the cowling support, is circular, or a key-shaped slot is not provided, as in Figs. 1 to 4, 7 and 8.

Figure 2:
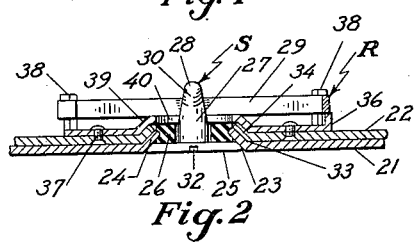
Fig. 2 is a longitudinal section of the device and parts taken along line 2—2 of Fig. 1.
Figure 7:
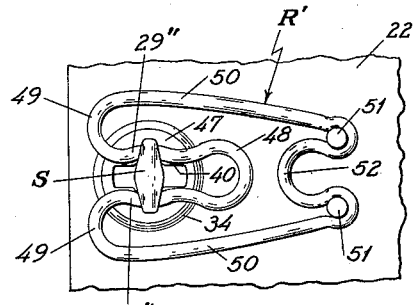
Fig. 7 is a plan view of a fastening device constituting a second embodiment of this invention, in locked position for holding two parts together.

In the second embodiment of this invention, as illustrated in Fig. 7, the stud S is similar to the stud of Figs. 1 to 3, but a boss 47 is provided by suitably punching or otherwise forming plate 22, the central portion of the boss being provided with a key-shaped slot 40, for guiding the stud toward and away from a receiver R'.

Figure 4:
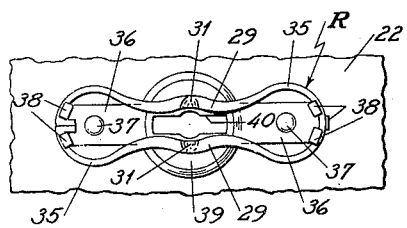
Fig. 4 is a plan view of the receiver of the device of Fig. 1, attached to one of the parts to be held together.

Receiver R', as before, is provided with arms 29'', which extend along opposite sides of the key slot 40, and are provided with detents 31, as before and such as shown in Fig. 4, for engaging the cam surfaces on the stud. However, the arms are connected together at one end by a loop 48, while the opposite ends form loops 49 which continue in spaced relation as legs 50 to rivets 51, spaced relatively close together on the same side of the hole in plate 22. From rivets 51, the ends of legs 50 join in a loop 52 between the rivets. Loops 48, 49 and 52 give the arms sufficient resiliency to be readily spread apart when the stud is turned to locking or unlocking position, but the size of the wire of which the spring member is made is preferably sufficient so that the arms are held relatively stiffly, to assist in preventing spreading upon the imposition of load. However, as explained in connection with Fig. 1, the arms rest directly on boss 47, so that the friction of the arms on the boss prevents lateral movement except on the imposition of an excessive or abnormal load.

An advantage of the embodiment illustrated in Fig. 7 lies in the fact that the fastening device can be installed relatively close to a corner, since the rivet holes are on the same side of the hole in the plate 22 and are spaced from the edge of the plate a sufficient distance to prevent weakening by attachment of the stud receiver.

Figure 8:
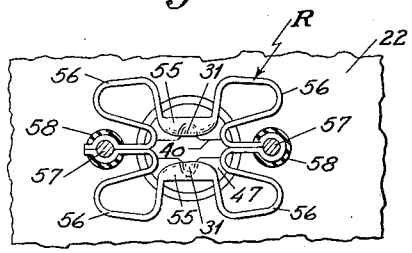
Fig. 8 is a plan view of a receiver attached to one of the parts to be held together, illustrating a second alternative construction of the embodiment of Fig. 1.

In an alternative form shown on Fig. 8 I employ a receiver R having a spring member 29' somewhat similar to the spring 29 illustrated in Fig. 1 which may be formed from single continuous sections of spring stock. The spring member is provided with relatively heavy stud-engaging sections 55 having detents 31, as before, and the stud-engaging sections are held against lateral movement by friction against boss 47, formed in plate 22 in a manner similar to that previously described and shown in Fig. 7. At each end of both stud-engaging sections is a loop 56 which doubles back upon itself and meets the loop from the corresponding end of the opposite stud-engaging section at the edge of the slot 40 in boss 47 to form tabs which are adapted to prevent the end of the stud from catching on the edge of the hole in plate 22. Each end of the loop may then extend outwardly to encircle a rivet 57.

To hold the spring member more securely to the inner plate 22, the ends thereof surrounding rivets 57 may be enclosed by a slotted thimble 58, formed to direct the spring member straight across the boss. It will be understood, of course, that the edge of the spring member may alternatively extend downwardly from the boss, so that normal rivets may be utilized in attaching the receiver to the second part.

In the embodiment of this invention illustrated in Figs. 9 to 12, inclusive, the stud S' may be similar to the stud S' of Fig. 6, i. e. provided with a wedge-shaped end 28 having outwardly extending cam surfaces 30 and flat surfaces 41 at the outer ends thereof. The receiver R'' thereof is adapted to be stamped or otherwise produced from relatively flat sheet or plate, instead of being bent to the form desired, as in the previous embodiments. Thus the receiver R'' may include parallel arms 60 having relatively heavy stud-engaging sections 61 provided with detents 31, for locking the stud in closed position, the arms being connected at each end 62 of the receiver. One end of the receiver is provided with a rivet hole 63, while the opposite end is provided with a slot 64, so that the receiver may be attached to plate 22 by a special rivet 65 slotted to support the ends of the receiver at the same height as flange 34. Slot 64 permits slight longitudinal movement of that end of the spring member when the arms 60 are spread apart during locking and unlocking. If desired, tabs 66 may be formed between the arms to extend to the edge of flange 34 to prevent the ends of the stud head from catching on the edge of the flange.

Figure 13:
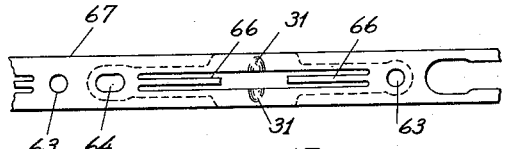
Figure 12:
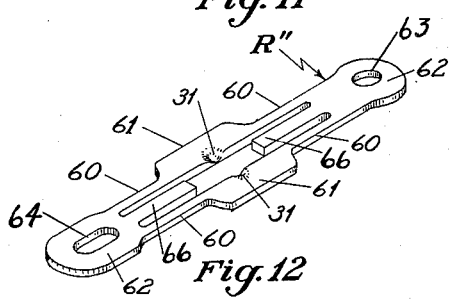

A particular advantage of the receiver R″ lies in the fact that it may be stamped or punched out of a continuous sheet or strip, as in Fig. 13. As the strip of metal passes through a dieing machine or multiple punch press, the material between the arms may be punched out in one stage, tabs 66 being simultaneously formed, while the rivet hole 63 and slot 64 may be punched out in the next stage, and detents 31 formed in the next succeeding stage. At the last stage, the entire blank may be punched from the strip, as shown in dotted lines in Fig. 13. The production rate of such receivers may be tremendous, since after the dies and punches are made and installed and the machine is set up for correct operation, the steps are performed automatically and the stamped receivers may be ejected from the machine at a relatively fast rate, such as one or more every second.

Preferably, the strip or stock from which the receiver R″ is stamped is spring stock annealed to reduce the wear on punches and dies. After the parts have been stamped out, they may be heated in batches in a furnace and then quenched with or without a subsequent draw, as desired, to produce the desired spring qualities.

Figure 14:
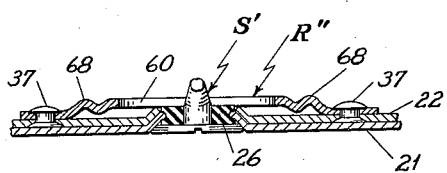
Fig. 14 is a longitudinal section, similar to Fig. 10, illustrating a variation of the receiver of the device of Fig. 9.
Figure 10:
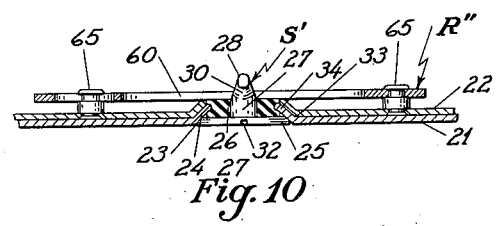
Fig. 10 is a longitudinal section of the device and parts taken along line 10—10 of Fig. 9.

To obviate the necessity for special rivets, the ends of the receiver R″ may be bent down and riveted directly to plate 22, as in Fig. 14. In such instance, it is desirable to provide corrugations or crinkles 68 to permit a slight contraction or elongation of the central portion of the receiver when the arms are spread apart or moved back together again, during turning movement of the stud. Also, tabs 66 may be eliminated, if conditions permit.

Figure 15:
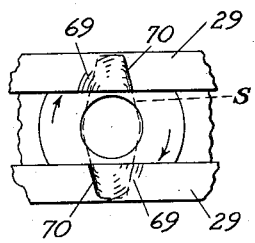
Fig. 15 is an enlarged fragmentary plan view illustrating cam-surface engaging notches on the arms of the receiver which permit the stud to be turned for locking in one direction only, and for unlocking only in the opposite direction.
Figure 11:
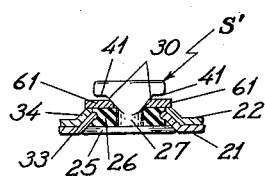
Fig. 11 is a cross section of the device and parts taken along line 11—11 of Fig. 9.

In each of the modifications hereinbefore described, the stud is rotatable into and out of locking position in either direction, i. e. by a clockwise or counterclockwise movement. In some instances it may be desirable, or some specifications may require, that the stud be moved into locking position in one direction only and from locking to unlocking position in the opposite direction. For this purpose, the stud-receiving detents in the arms of the receiver may be formed as in Fig. 15, with a normal entrance slope 69 on one side and a wall 70 on the opposite side. The walls 70 prevent the stud from being moved past a 90° position when locking, in turning the stud in the direction of the arrows of Fig. 15. At the same time, the walls prevent the stud from being turned to unlocking position except in the opposite direction. Such a feature is, of course, optional.

In the receiver R″ the relatively heavy stud-engaging sections 61 are merely made wider than the remainder of the arms, which are narrower for spring purposes. The stud-engaging sections thus cover a considerable portion of hole 33, and thereby increase the amount of friction between themselves and the top of flange 34. Also, the relatively wide stud-engaging portions 61 rest more evenly upon the top of the flange 34 and have less tendency to turn upon the imposition of a load upon the stud. If desired, the grommet 26 by which the stud is rotatably secured to plate 21 may have sufficient thickness so that it extends up to the stud-engaging portions 61 as in Fig. 14, thereby increasing the frictional surface which prevents outward movement of the arms when additional load is placed on the stud. Of course, the outwardly extending cam surfaces 30 permit a variation in height of flange 34, or differences in thickness of the parts to be fastened together, so that the grommet may not always extend to the receiver. However, it will be found that even without contact between the grommet and the receiver, the friction between the stud-engaging portions and the edge of the flange 34 is sufficient to permit loads much heavier than normal to be imposed upon the stud without the arms spreading. Of course, if an extremely heavy load is placed on the stud, the stud will still not pull through, since as soon as the flat surfaces 41 engage the tops of the arms, the arms will not spread apart any farther, as will be evident from Fig. 11. It is to be emphasized however, that such flat surfaces are a safety feature, and during the imposition of normal loads on the stud, even during severe vibration, the parts will remain securely fastened together and without separation.

Figure 16:
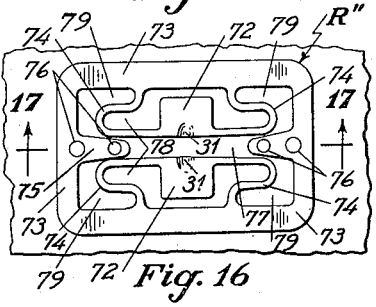
Fig. 16 is a plan view of a receiver attached to one of the parts to be held together, of an alternative construction of the embodiment of Fig. 9.
Figure 18:
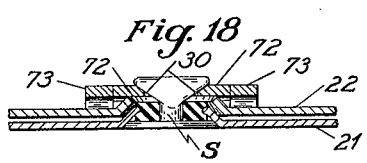
Fig. 18 is a cross section of a device which includes the receiver of Fig. 16, in locked position fastening two parts together.
Figure 17:
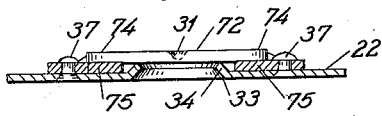
Fig. 17 is a longitudinal section taken through the receiver and part along line 17—17 of Fig. 16.

To provide an abutment which limits the lateral movement of the stud-engaging portions, the receiver R″ may be slightly modified, as in Figs. 16 to 18, inclusive, and may be punched or stamped from sheet or strip stock, as described just above, or individual blanks may be stamped out and processed in a transfer press or similar multiple punching and forming machine. The receiver R″ of Figs. 16 to 18 is provided with relatively heavy stud-engaging sections 72 disposed on opposite sides of and overlying flange 34 in inner plate 22, and provided with notches or detents 31 as before. This receiver also includes a border 73 extending completely therearound, the sides of the border being adapted to limit the outward lateral movement of the stud-engaging sections 72, as in Fig. 18, when an abnormal load is placed on the stud, sufficient to cause the plates to separate slightly. It will be understood, of course, that separation of the plates 21 and 22 during normal loading is prevented by friction between the stud-engaging sections 72 and the top of flange 34. In this receiver, the inside ends of each stud-engaging section are connected by resilient loops 74 with the border 73, the loops joining the border at points spaced longitudinally with respect to the stud-engaging sections, so that when the stud-engaging sections are forced outwardly against the border by an abnormal load on the stud, they will fit between the resilient loops 74.

The ends of the border are displaced downwardly with respect to the central portion thereof, as in Fig. 17, so that the ends of the border may be attached to the inner plate 22, as by rivets 37, and the stud-engaging portions may extend over and lie flat against the inner edge of flange 34. For attaching the receiver at different points, if desired, tabs 75, as in Fig. 16, may extend inwardly between loops 74, and a plurality of rivet holes 76 provided in each tab. This enables the receiver R'' to be attached to the inner plate by rivets spaced at distances corresponding to two or more different sizes of the cowling fastener previously in use. Since there is no deflection of the receiver upon initial loading of the stud, it will usually be found that the receiver R'' may be made in a lesser number of sizes than the cowling fastener previously in use, so that each size of receiver R'' will be adapted to replace more than one size of the previous cowling fastener.

In making the receiver R'' of Figs. 16 to 18, the central aperture 77 bounded by the stud-engaging portions, the loops, and the inner ends of tabs 75 may first be punched out, and notches 31 formed in the next operation. Then, the spaces 78 bounded by the stud-engaging portions, the loops, and border 73 may be punched out, after which the spaces 79 bounded by the loops, border and tabs may be punched out. All similar spaces may be punched simultaneously, or each space punched in a separate operation, if desired. Next, the rivet holes 76 may be punched, and the ends of the border, including tabs 75, moved downwardly with respect to the central portion of the receiver. At the same time, the tabs and loops are sheared when the tabs are moved downwardly, the tabs and loops previously being left connected together for a short distance, to simplify punching operations, if desired. It will be understood, however, that the order of the various punching and forming operations may be varied, and that the operations themselves may be changed, in accordance with machine and production requirements.

Figure 19:
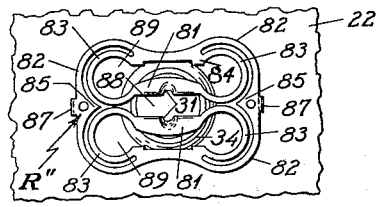
Fig. 19 is a plan view of a receiver attached to one of the parts to be held together, of an additional alternative construction of the embodiment of Fig. 9.
Figure 9:
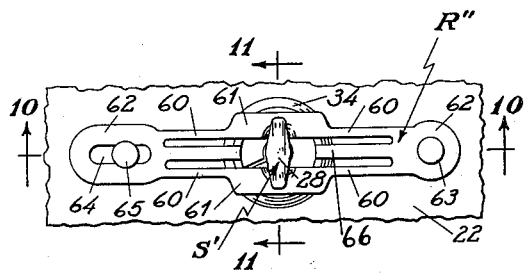
Fig. 9 is a plan view of a device fastening two parts together and constituting a third embodiment of this invention.
Figure 20:
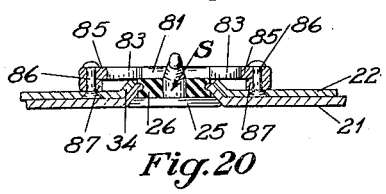
Fig. 20 is a longitudinal section of a device which includes the receiver of Fig. 19, in locked position fastening two parts together.

To limit the movement of the stud-engaging portions in a slightly different manner, the receiver R'' may be further modified, as in Figs. 19 and 20, and also may be punched or stamped from sheet or strip stock, as described above, or individual blanks may be stamped out and processed in a transfer press or similar multiple punching and forming machine.

The receiver R'' of Figs. 19 and 20 includes a pair of relatively heavy inner stud-engaging arms or legs 81 provided with notches 31 and overlying hole 33 in inner plate 22, and also resting upon the inner edge of flange 34. This receiver also includes a border or outer legs 82 extending completely therearound and, at each end, substantially conforming in shape to the outside of loops 83. Loops 83 extend from each end of each stud-engaging arm 81, and are connected to the border at points 84, spaced laterally from the ends of the stud-engaging arms. To conform more closely to the outside of the loops, the border may be provided with a pointed projection 85 at each end. When an abnormal load is placed upon the stud S—the construction and attachment of which to outer plate 21 has been described previously—the longitudinal and lateral movement of loops 83 is limited by engagement of the loops with the border 82. Thus, although the stud-engaging arms may not abut against the border, as in the receiver of Figs. 16 to 18, inclusive, the effect of the limitation of the lateral and longitudinal movement of loops 83 is to introduce extremely strong resistance to loads greater than normal and prevent further outward movement of the arms 81, thus effectively resisting heavy overloads.

The receiver of Figs. 19 and 20 may extend across the flange 34, as in Fig. 20, and be attached to the flange by relatively long rivets 86. To space the main body of the receiver above inner plate 22 at the height of flange 34, a suitable washer or the like may be placed over the rivet, or tabs 87 may be formed at the ends of the receiver and then bent under, with the rivet holes extending through both border and tab.

In forming the receiver R'' of Figs. 19 and 20, the spaces 88 between the arms 81 may be first punched out, and then notches 31 formed in the arms, the inner edges of the arms being simultaneously rounded, if desired. Next, the spaces 89 bounded by the arms, loops, and border may be punched out. The entire receiver, including tabs 87 extending outwardly, may next be punched out, and the tabs then bent under the ends of the receiver. After the rivet holes have been punched to extend through tabs 87, the loops 83 may be sheared from each other and from the border. The space between the loops and the border has been slightly exaggerated in Fig. 19, for clarity of illustration, although this distance may be made as great or little as desired for any particular purpose. However, the loops can readily be sheared from the border, which is a simpler operation than if a relatively thin curved punch is attempted to be used. Due to the resiliency of the material, the loops may be sheared without separating the loops from the border, although if there is any tendency for this to occur, the loops may be sheared from the border before spaces 89 are punched out. Again, it will be understood that the manner and order of forming the various portions of the receiver may be changed or varied as desired.

From the foregoing, it will be apparent that a fastening device constructed in accordance with this invention is reliable in operation and is particularly advantageous when utilized to fasten two parts together which are subject to vibration. The lateral movement of the stud-engaging portions of the receivers upon a turning movement of the stud, during locking and unlocking, is an important feature, since it permits the receiver to rest against the inner plate or flange 34, and thereby prevents any slight separation of the parts upon initial loading. The friction between the stud-engaging portions and the inner plate or flange 34, or in case of the receiver R of Fig. 1, the friction against the surface of base 36, which friction resists outward movement of the stud-engaging arms and thereby causes the parts to be held closely together during normal loading, is another important feature.

It will be apparent that the size and shape of the receiver may be varied within relatively wide limits, and that various methods of construction may be utilized, since in the case of receivers R and R' the spring element may be made from round or flat spring stock bent to the desired shape, and receiver R'' may be stamped or punched from flat or sheet stock. Thus, the manufacturing methods may be varied relatively widely.

It will be understood that embodiments of this invention other than those described may exist, and that various changes other than those enumerated may be made, all without departing from the spirit and scope of this invention.

What is claimed is:

1. In a device for fastening two parts together, in which a stud is secured for turning movement to one of said parts and the second part is provided with an inwardly extending flange surrounding a hole therein through which said stud may be inserted to engage a receiver for said stud attached to said second part, the improvement which comprises a stud having a shank provided with outwardly extending and inclined surfaces, and a receiver having a pair of arms adapted to extend across said hole and adapted to be spread apart and engaged by said inclined surfaces upon insertion of said stud between said arms and a subsequent turning movement thereof, said receiver being adapted to be attached to said second part at points spaced from said hole and said arms being constructed and arranged to extend over and rest upon said inwardly extending flange to provide frictional resistance against outward movement of said arms.

2. A device for fastening a pair of parts together, comprising a stud adapted to be rotatably secured to one of said parts and having a shank provided with outwardly extending inclined surfaces and flat surfaces at the ends thereof; and a receiver for said stud adapted to be attached to said other part and having a pair of resiliently mounted and oppositely disposed arms adapted to overlie a hole through which said stud may be inserted to engage said arms, said arms being adapted to be spread apart slightly upon turning movement of said stud, said flat surfaces on said stud being adapted to engage the top of said arms to limit the extent to which said arms will be spread apart by a greater than normal force exerted upon said stud, and said receiver also having portions spaced with respect to the stud-engaging portions of said arms adapted to prevent the flat surfaces of said stud from becoming caught on the edge of said hole when said stud is being disengaged from said receiver.

3. In a device for fastening two parts together, including a stud adapted to be rotatably attached to one part and having a shank provided with outwardly extending cam surfaces, and a receiver for said stud adapted to be attached to the other of said parts at points on opposite sides of a hole in said second part through which said stud is inserted, the improvement wherein said receiver including a spring having relatively heavy stud-engaging portions adapted to overlie said hole in opposed relation and provided with notches for engaging said cam surfaces when said stud is turned after insertion through said hole and between said stud-engaging portions, said spring having a lateral loop extending from each end of each stud-engaging portion and substantially doubling back upon itself to meet the loop extending from the opposite stud-engaging portion at a point adjacent the edge of said hole, thereby forming projections on opposite sides of said hole to prevent said cam surfaces from catching on the edge of said hole when said stud is turned to a different position and moved away from said receiver during disassembly of said parts.

4. A device for fastening two parts together, comprising a stud adapted to be rotatably attached to one of said parts and having a shank provided with outwardly extending cam surfaces; and a receiver for said stud adapted to be attached to the other of said parts and extend across a hole in said second part through which said stud may be inserted, said receiver including a spring element made from relatively flat stock and having a pair of arms extending in spaced apart parallel relation, each arm having a relatively heavy stud engaging section over said hole and provided with a notch for reception of said cam surfaces when said stud is inserted between said arms and turned to cause said cam surfaces to engage said notches, said arms being connected together in end portions adapted to be secured to said second part at points spaced from and on opposite sides of said hole, said stud being provided with a relatively flat surface substantially normal to the shank at the end of each cam surface for engaging the top of said arms when the tension on the stud is sufficient to force said cam surfaces to spread said arms apart a predetermined distance, and said spring element having tabs extending inwardly between said arms to the edge of said hole to prevent the flat surfaces on said stud from catching on the edge of said hole when said stud and part are removed from said receiver and second part.

5. A device for fastening two parts together, comprising a stud adapted to be attached to one part for turning movement and having a shank provided with outwardly extending cam surfaces; and a receiver adapted to be attached to the second part and having centrally disposed relatively heavy stud-engaging portions and curved loops extending from each end of each stud-engaging portion to a point laterally spaced from the end of the stud-engaging portion, said receiver also having a border extending completely therearound and said loops connecting with said border at said laterally spaced points, the ends of said border being spaced only a slight distance from said loops and conforming in shape thereto to limit the longitudinal and transverse movement of said loops.

6. In a device for fastening two parts together, including a stud having a head provided with means for rotating said stud, and a shank provided with outwardly extending cam surfaces, said stud being adapted to be rotatably attached to one part, the improvement which comprises a receiver for said stud including an elongated spring having a loop at each end, said loops being connected by arms extending in opposed relation, and a base adapted to be attached to said second part and constructed to extend around and over an aperture in said second part through which said stud is inserted for engagement with said arms, said base being provided at each end with means for attachment to said spring loops and also provided with a guiding slot for said stud over said aperture, the surface of said base adjacent said aperture being constructed so as to be frictionally engaged by said arms to limit the lateral movement of said arms.

7. In a device for fastening two parts together of the type including a stud for attachment to one part for turning movement and having a shank provided with outwardly extending cam surfaces, the improvement which includes a receiver adapted to be attached to the second part, said receiver having a border extending therearound and stud-engaging portions movable laterally by said stud, said stud-engaging portions being connected to said border by curved resilient members, and said border being adapted to limit movement of said stud-engaging portions.

8. In a device for joining together first and second parts in face to face relation, said parts having registered openings with a stud rotatably secured in the opening in the first part and adapted for engagement with a receiver on the uncovered face of the second part, said receiver having resilient stud-engaging arms extending across the opening in the second part and supported against transverse bending towards the first part, the improvement which includes a transverse member on the end of the stud adapted to project between the resilient arms of the receiver having opposed oppositely extending cam faces inclined with respect to the stud axis and terminating in opposed flat surfaces, said cam surfaces being disposed to engage said arms as the stud is turned to force said arms laterally and to guide said member upwardly onto said arms, said flat surface engaging said arms when the stud is in locked position.

9. In a device for fastening two parts together in a face to face relationship including a stud adapted to be attached to the first part for turning movement with respect thereto, said part having holes therein through which said stud is adapted to extend, the improvement which comprises a receiver for the stud for attachment to the second part, said receiver including a border, a pair of integrally formed internal loops in the border resilient in the plane of the border, each of said loops having relatively large portions disposed to overlie the holes in the parts and movable towards said border when engaged by opposed and outwardly extending cam surfaces on the stud.

10. In a fastening device of the rotary operative type adapted to secure a plurality of apertured parts in face to face relation including a receiver for attachment to one of the parts having legs resilient in a plane generally parallel to the plane of the part and overlying the aperture and defining a stud-receiving opening, the improvement which includes a rotary operative stud having a head bearing against a surface of one of the members, a shank on the head adapted to extend through all the apertured members and the legs of the receiver, and a transverse portion on the end of the shank having opposed and oppositely extending cam surfaces formed thereon for engaging the receiver legs and for moving said legs in a direction transverse to the axis of the shank, said cam surfaces terminating in opposed flat portions extending along an edge of the shank generally normal to the axis of the shank for engagement with the exposed face of the receiver legs when the stud is turned to locked position.

11. A device for fastening two parts together, as defined in claim 1, in which said receiver includes a spring member shaped in a modified figure-eight form and having an open center with a stud engaging portion on each side of said center.

12. A device for fastening two parts together, as defined in claim 1, in which said receiver includes an elongated spring having a loop at each end, said loops being connected by arms extending in opposed relation, and a base attached to said second part and extending around and over the hole in said second part through which said stud is inserted for engagement with said arms, said base being provided at each end with means for attachment to said spring loops and also provided with a guiding slot for said stud over said aperture.

13. In a device for fastening two parts together, including a stud adapted to be attached to one part for turning movement with respect thereto, said parts having holes through which said stud is adapted to extend, the improvement which comprises a receiver for said stud adapted to be attached to the other part and having a pair of laterally movable resilient arms adapted to overlie the hole in said other part and adapted to frictionally engage a predetermined surface to restrain lateral movement of said arms, an inwardly extending flange on said other part about said hole, the inner edge of said flange providing said predetermined surface, and a pair of opposed and outwardly extending cam surfaces on said stud to engage said arms.

14. A device for fastening two parts together comprising a stud adapted to be rotatably attached to one of said parts and having a shank provided with outwardly extending cam surfaces, a receiver for said stud attached to the other of said parts and extending across a hole in said other part through which said stud is inserted, said receiver including a spring element having a pair of arms extending in spaced apart parallel relation, each of said arms having a relatively heavy stud engaging portion, said arms being connected by end portions secured to said other part at points spaced from and on opposite sides of said hole, said stud being provided with a relatively flat surface at the end of each cam surface for engaging the top of said arms when said cam surfaces have spread said arms apart a predetermined distance.

RICHARD M. STORER.

REFERENCES CITED

The following references are of record in the file of this patent:

UNITED STATES PATENTS

| Number | Name | Date |
|---|---|---|
| 2,183,085 | Richardson | Dec. 12, 1939 |
| 2,259,076 | Markey | Oct. 14, 1941 |
| 2,285,661 | Hryzack | June 9, 1942 |
| 2,306,952 | Jones | Dec. 29, 1942 |
| 2,307,132 | Hufferd | Jan. 5, 1943 |
| 2,314,470 | Warren | Mar. 23, 1943 |
| 2,325,699 | Moran | Aug. 3, 1943 |
| 2,341,575 | Segal | Feb. 15, 1944 |
| 2,352,045 | Van Opel | June 20, 1944 |
| 2,367,812 | Venditty | Jan. 23, 1945 |